(12) United States Patent
Vedrine et al.

(10) Patent No.: US 8,971,875 B2
(45) Date of Patent: Mar. 3, 2015

(54) DEVICE AND METHOD FOR PERFORMING A REVERSE SINGLE RADIO VOICE CALL CONTINUITY (RSRVCC) PROCEDURE

(75) Inventors: Arnaud Vedrine, Paris (FR); Saso Stojanovski, Paris (FR)

(73) Assignee: LG Electronics Inc., Seoul (KR)

(*) Notice: Subject to any disclaimer, the term of this patent is extended or adjusted under 35 U.S.C. 154(b) by 26 days.

(21) Appl. No.: 13/695,686

(22) PCT Filed: Apr. 20, 2011

(86) PCT No.: PCT/KR2011/002827
§ 371 (c)(1),
(2), (4) Date: Nov. 1, 2012

(87) PCT Pub. No.: WO2012/046930
PCT Pub. Date: Apr. 12, 2012

(65) Prior Publication Data
US 2013/0053028 A1    Feb. 28, 2013

Related U.S. Application Data

(60) Provisional application No. 61/389,660, filed on Oct. 4, 2010, provisional application No. 61/390,198, filed on Oct. 6, 2010.

(51) Int. Cl.
*H04W 4/00* (2009.01)
*H04W 36/00* (2009.01)
*H04W 8/12* (2009.01)

(52) U.S. Cl.
CPC ............ *H04W 36/0022* (2013.01); *H04W 8/12* (2013.01)
USPC .................... 455/432.1; 455/436; 370/331

(58) Field of Classification Search
CPC .................................. H04W 8/04; H04W 8/12
USPC .................... 455/432.1, 436; 370/331
See application file for complete search history.

(56) References Cited

U.S. PATENT DOCUMENTS

| 8,472,405 | B2 * | 6/2013 | Rune | 370/331 |
|---|---|---|---|---|
| 2002/0137532 | A1 * | 9/2002 | Landais et al. | 455/466 |
| 2002/0150085 | A1 * | 10/2002 | Flinck et al. | 370/352 |
| 2003/0153309 | A1 | 8/2003 | Bjelland et al. | |
| 2003/0166402 | A1 | 9/2003 | Svensson et al. | |
| 2004/0029614 | A1 * | 2/2004 | Back et al. | 455/560 |
| 2004/0266438 | A1 * | 12/2004 | Bjelland et al. | 455/437 |
| 2007/0116011 | A1 | 5/2007 | Lim et al. | |
| 2008/0165725 | A1 * | 7/2008 | Huomo et al. | 370/328 |

(Continued)

FOREIGN PATENT DOCUMENTS

| WO | WO 2009/088331 A2 * | 7/2009 | H04Q 7/38 |
|---|---|---|---|
| WO | WO 2010/003501 A2 * | 1/2010 | H04W 48/18 |

OTHER PUBLICATIONS

"Performance measurements CN PS domain (Release 10)", 3GPP TS 32. 406 v10 .0. 0. Jun. 2010.

*Primary Examiner* — Christopher M Brandt
(74) *Attorney, Agent, or Firm* — McKenna Long & Aldridge LLP

(57) ABSTRACT

Method comprising steps of at a network entity: —receiving a Routing Area Update message from a UE, —checking whether the Update Type of the Routing Area Update message is Routing Area Update, and —transmitting to a MSC a message containing information related to the network entity if the Update Type of the Routing Area Update message is Routing Area Update.

6 Claims, 2 Drawing Sheets

(56) References Cited

U.S. PATENT DOCUMENTS

| | | | |
|---|---|---|---|
| 2010/0003976 A1* | 1/2010 | Zhu et al. | 455/433 |
| 2010/0220680 A1* | 9/2010 | Ramankutty et al. | 370/329 |
| 2011/0230192 A1* | 9/2011 | Tiwari | 455/436 |
| 2011/0249652 A1* | 10/2011 | Keller et al. | 370/331 |
| 2012/0039303 A1* | 2/2012 | Stenfelt et al. | 370/331 |
| 2012/0142347 A1* | 6/2012 | Morad et al. | 455/435.1 |

\* cited by examiner

DEVICE AND METHOD FOR PERFORMING A REVERSE SINGLE RADIO VOICE CALL CONTINUITY (RSRVCC) PROCEDURE

This Application is a 35 U.S.C. §371 National Stage Entry of International Application No. PCT/KR2011/002827, filed Apr. 20, 2011 and claims the benefit of U.S. Provisional Application Nos. 61/389,660, filed Oct. 4, 2010 and 61/390,198, filed Oct. 6, 2010, all of which are incorporated by reference in their entirety herein.

TECHNICAL FIELD

The present invention generally relates to devices and methods for providing a network with the capability to perform an rSRVCC procedure to transfer a voice call established over UTRAN/GERAN network using the CS core network to E-UTRAN/HSPA network using the PS core network.

BACKGROUND ART

Single Radio Voice Call Continuity (SR-VCC) has been standardized since release 8 in 3GPP TS 23.216 (version 9.3.0: Single Radio Voice Call Continuity (SRVCC); Stage 2) to provide continuity when a single radio capable User Equipment (UE) moves from E-UTRAN/HSPA (Evolved UMTS Terrestrial Radio Access Network/High Speed Packet Access) to UTRAN/GERAN (UMTS Terrestrial Radio Access Network/GSM EDGE Radio Access Network) while engaged in a voice call established over IP Multimedia Subsystem (IMS).

In SRVCC specifications up to and including release 10, only the E-UTRAN/HSPA to UTRAN/GERAN direction is addressed. How to perform subsequent handovers in the reverse direction ("handback") was studied at the time SRVCC was first introduced (in 3GPP release 8), and a solution was proposed in 3GPP TS 23.216 (version 1.1.0: Single Radio Voice Call Continuity (SRVCC); Stage 2). But it then got subsequently removed from the specification, as it was not deemed satisfactory.

Technical report 3GPP TR 23.885 (version 0.4.0: Feasibility study of SR-VCC for UTRAN/GERAN to E-UTRAN/HSPA service continuity) has been initiated in 3GPP release 10 and is pursued in 3GPP release 11. It aims at studying how the network could handover a single radio capable UE from UTRAN/GERAN to E-UTRAN, referred to as reverse SRVCC to E-UTRAN/HSPA, or rSRVCC in the following.

All solutions currently considered for rSRVCC require that the Mobile Switching Centre (MSC) sends a message to the Serving GPRS Support Node (SGSN) at the time of the rSRVCC access transfer preparation. It is thus assumed that the source MSC knows who the source SGSN serving the UE is. However, no prior art solution existed to that problem.

Embodiments of the present invention will improve the situation. In particular, embodiments of the present invention will propose devices and methods for making it possible for a MSC to always know the address of the source SGSN.

DISCLOSURE OF INVENTION

Solution to Problem

To address these needs, a first aspect of the present invention relates to Method comprising steps of, at a network entity:

receiving a Routing Area Update message from a UE, checking whether the Update Type of the Routing Area Update message is Routing Area Update, and transmitting to a MSC a message containing information related to the network entity if the Update Type of the Routing Area Update message is Routing Area Update.

The present invention may thus aim at making it possible for a MSC to always know updated information related to the network entity, for example the address of the source SGSN.

The method may comprise a step of the network entity receiving from a HSS a message containing information related to the MSC serving the UE.

The method may further comprise a step of checking whether the UE is capable to perform an rSRVCC procedure from UTRAN/GERAN to E-UTRAN/HSPA, the transmission of the message to the MSC being performed if the UE is capable.

The method may further comprise a step of, at the network entity, receiving a Mobility Management and bearer context information of the UE from a second network entity, the second network entity being the previous SGSN serving the UE.

When the network operates in Network Mode of Operation (NMO) I, the message may contain information related to the network entity being transmitted to an anchoring MSC in an ongoing CS call.

A second aspect of the present invention relates to a method comprising steps of:

receiving, at a MSC, a rSRVCC HO request for a UE from a source radio access network, sending a message to a HSS to request serving SGSN information for the UE, receiving from the HSS, a message containing information related to the SGSN currently serving the UE, sending to the SGSN a message for performing rSRVCC HO.

A third aspect of the present invention relates to a method comprising steps of:

receiving, in NMO II/III, at a MSC, a Location Area Update from a UE, receiving from the HSS, a message containing information related to the SGSN currently serving the UE, sending to the SGSN a rSRVCC request for the UE when receiving a rSRVCC request for the UE from a source access network . . . .

BRIEF DESCRIPTION OF DRAWINGS

The present invention is illustrated by way of example, and not by way of limitation, in the figures of the accompanying drawings, in which same reference numerals refer to similar elements and in which.

MODE FOR THE INVENTION

Figure 1:
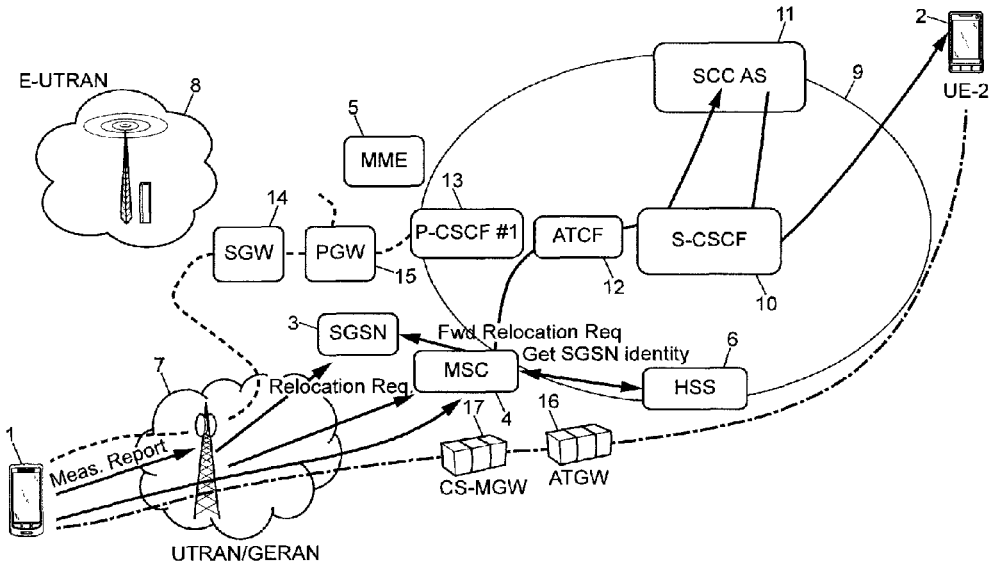
FIG. 1 is a schematic block diagram of a network architecture according to embodiments of the invention.

FIG. 1 represents a network architecture according to embodiments of the invention.

The network comprises a first User Equipment (UE) 1, a second UE 2, a Serving GPRS Support Node (SGSN) 3, a Mobile Switching Centre (MSC) server 4, a Mobility Management Entity (MME) 5, a UMTS Terrestrial Radio Access Network/GSM EDGE Radio Access Network (UTRAN/GERAN) 7, a target Evolved UMTS Terrestrial Radio Access Network (E-UTRAN) 8, an IP Multimedia Subsystem (IMS) network 9, a Serving Gateway (SGW) 14 and a Packet Data Network Gateway (PGW) 15, an Access Transfer Gateway (ATGW) 16 and a Circuit-Switched Media Gateway (CS-MGW) 17.

The IMS network 9 comprises a Home Subscriber Server (HSS) 6, a Serving Call State Control Function (S-CSCF) 10, a Service Centralization and Continuity Application Server (SCC AS) 11, an Access Transfer Control Function (ATCF) 12, and a Proxy-Call State Control Function (P-CSCF) 13.

Figure 2:
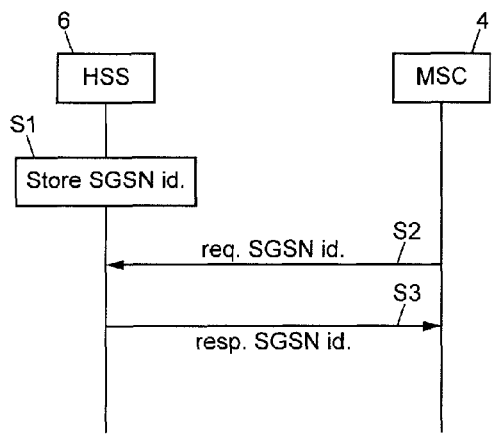
FIG. 2 is a schematic diagram showing steps of a method for a MSC to get the address of the source SGSN according to a first embodiment of the invention.

Referring to FIG. 2, we are describing below a method for a MSC to get the address of the source SGSN according to a first embodiment of the invention.

In step S1, the HSS 6 stores the SGSN identity of the SGSN 3 serving the UE 1. Step S1 is performed each time the UE 1 changes SGSN, for updating data stored in the HSS 6.

In step S2, the MSC 4 queries the HSS 6 to retrieve the SGSN identity. Step S2 is performed at the time of the handover.

In step S3, in response to the reception of the request, the HSS 6 sends to the MSC 4 a message containing the SGSN identity. The MSC 4 thus gets the address of the source SGSN 3.

A benefit of this embodiment is its simplicity. However, this embodiment creates extra load for the HSS 6, and besides, in roaming situations, it may add some extra delay to the handover procedure, when the MSC 4 is located in the visited network, and the HSS 6 in the home network.

Figure 3:
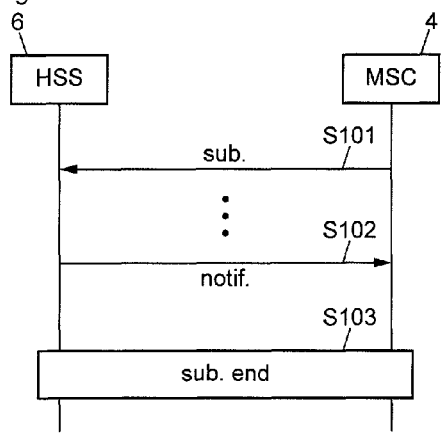
FIG. 3 is a schematic diagram showing steps of a method for a MSC to get the address of the source SGSN according to a second embodiment of the invention.

Referring to FIG. 3, we are describing below a method for a MSC to get the address of the source SGSN according to a second embodiment of the invention.

In step S101, the MSC 4 subscribes to the HSS 6. Step S101 may be performed when a call starts or when it gets handed over to CS via SRVCC. The MSC 4 may subscribe to the HSS 6 via the D interface.

In step S102, in case the UE 1 changes SGSN 3 during a call, the MSC 4 is notified by the HSS 6. The MSC 4 thus gets the address of the source SGSN 3.

In step S103, MSC 4 ends the subscription to the HSS 6. Step S103 may be performed when the call ends, or when the rSRVCC procedure ends.

This embodiment aims at solving the potential problem of the extra delay at handover time. However, as the first embodiment, it may create extra load for the HSS 6.

Figure 4:
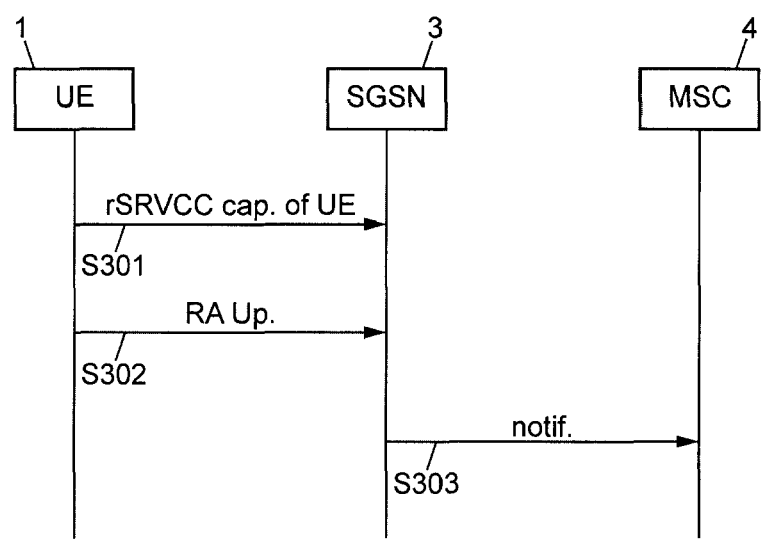
FIG. 4 is a schematic diagram showing steps of a method for a MSC to get the address of the source SGSN according to a third embodiment of the invention.

Referring to FIG. 4, we are describing below a method for a MSC to get the address of the source SGSN according to a third embodiment of the invention.

Here, the SGSN 3 is enhanced to send a notification to the MSC 4, when getting a Routing Area Update message from the UE 1.

In step S301, the SGSN 3 gets the rSRVCC capability of the UE 1.

In step S302, the SGSN 3 receives a Routing Area Update message from the UE 1.

In step S303, the SGSN 3 notifies the MSC 4 through the Sv interface that it is the serving SGSN 3 for the UE 1. Step S303 is performed each time it gets a Routing Area Update message in which the Update Type indicates "Routing Area Update", in case the UE 1 is enhanced for rSRVCC, and in case the MCS 4 is enhanced for rSRVCC (which the SGSN 3 would need to be configured to know).

When rSRVCC needs to take place, the MSC server enhanced for rSRVCC selects the identity of the SGSN it had stored.

At inter-SGSN routing area update, the new SGSN further receives a Mobility Management and bearer context information of the UE 1 from the previous SGSN 3 serving the UE 1. The new SGSN may further get the address of the MSC serving the UE 1 in the Insert Subscriber Data, which it receives from the HSS 6 as part of the existing procedure. If the inter-SGSN RAU occurs while the UE is engaged in a CS call that was subject to inter-MSC handover, the MSC address received in Insert Subscriber Data is that of the anchor MSC.

At inter-MSC Location area update, the MSC may get the address of the serving SGSN in the Insert Subscriber Data, which it receives from the HSS as part of the procedure.

Those procedures apply in case of NMO II/III both when the UE is in MM idle mode and in MM Connected mode.

The modified Routing Area Update procedure would also apply in case of NMO I when the UE is in MM connected mode. In case of NMO I, while the UE is in idle mode, the existing combined LA/RA update procedure applies: when the UE performs Combined RA/LA Update, the SGSN will be able to locate the MSC based on the TMSI in case an MSC has already been chosen for the UE, or selects a new MSC.

One benefit of this embodiment is that it only has a few impacts on the network in terms of extra load, and does not put any constraints on the network deployment.

The third embodiment further solves a problem specific to NMO II/III, which may occur when the UE changes the serving MSC and serving SGSN in Idle mode at the same time. In this case, there is no guarantee that the HSS will be updated first with the new MSC or with the new SGSN. If the HSS is updated with the new MSC first, the Insert Subscriber Data message will return the old SGSN, which is the wrong SGSN. With the third embodiment of the invention, this inconsistency will be automatically resolved when the HSS updates the SGSN with the new MSC in the Insert Subscriber Data message, following which the new SGSN notifies the new MSC that is the new serving SGSN.

While there has been illustrated and described what are presently considered to be preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in a reference to the plural and vice versa.

A person skilled in the art will readily appreciate that various parameters disclosed in the description may be modi-

The invention claimed is:

1. A method comprising, at a first Serving General Packet Radio Service (GPRS) Support Node (SGSN):
   receiving, by the first SGSN, a Routing Area Update message from a user equipment (UE);
   checking, by the first SGSN, whether the Update Type of the Routing Area Update message is Routing Area Update; and
   transmitting, by the first SGSN, to a Mobile Switching Center (MSC) a message containing information related to the first SGSN if the Update Type of the Routing Area Update message is Routing Area Update, wherein the message containing information related to the first SGSN notifies the MSC that the first SGSN is a SGSN currently serving the UE.

2. The method according to claim 1, further comprising receiving from a Home Subscriber Server (HSS) a message containing information related to the MSC serving the UE.

3. The method according to claim 1, further comprising checking whether the UE is capable to perform a reverse Single Radio Voice Call Continuity (rSRVCC) procedure from Universal Mobile Telecommunications System (UMTS) Terrestrial Radio Access Network/Global System for Mobile communications (GSM) Enhanced Data rates for GSM Evolution (EDGE) Radio Access Network (UTRAN/GERAN) to Evolved-UTRAN/High Speed Packet Access (E-UTRAN/HSPA), the transmission of the message to the MSC being performed if the UE is capable.

4. The method according to claim 1, further comprising, at the first SGSN, transmitting a Mobility Management and bearer context information of the UE to a second SGSN, the second SGSN being a new SGSN of an inter-SGSN RAU.

5. The method according to claim 1, wherein the network operates in Network Mode of Operation (NMO) I, the message containing information related to the first SGSN being transmitted to an anchoring MSC in an ongoing Circuit Switched (CS) call.

6. The method according to claim 1,
   wherein the message containing information related to the first SGSN includes at least one of identity information of the first SGSN or address information of the first SGSN.

* * * * *